United States Patent [19]

Schweigert

[11] Patent Number: 4,787,197

[45] Date of Patent: Nov. 29, 1988

[54] MULTI-PURPOSE CART AND GRASS COLLECTOR

[76] Inventor: James R. Schweigert, 5739 Juneau La., Plymouth, Minn. 55446

[21] Appl. No.: 748,112

[22] Filed: Dec. 31, 1986

[51] Int. Cl.$^4$ ............................................. A01D 34/70
[52] U.S. Cl. .................................................... 56/202
[58] Field of Search ................................. 56/202, 16.6

[56] References Cited

U.S. PATENT DOCUMENTS

| | | | |
|---|---|---|---|
| 2,174,465 | 9/1939 | Jedlicka | 16/44 |
| 2,973,224 | 2/1961 | Wall | 298/3 |
| 3,143,843 | 8/1964 | Allina | 56/202 |
| 3,193,997 | 7/1965 | Allina | 56/202 |
| 3,387,859 | 6/1968 | McClellan | 280/204 |
| 3,430,422 | 3/1969 | Dalton | 56/202 |
| 3,494,116 | 2/1970 | Lempke | 56/202 |
| 4,158,279 | 6/1979 | Jackson | 56/202 |
| 4,192,524 | 3/1980 | Twiestmeyer | 280/415 A |
| 4,239,253 | 12/1980 | Golze | 280/460 R |
| 4,417,765 | 11/1983 | Wirsbinski | 298/5 |
| 4,484,759 | 11/1984 | Zwick | 280/460 R |

FOREIGN PATENT DOCUMENTS

| | | |
|---|---|---|
| 1103768 | 3/1961 | Fed. Rep. of Germany . |
| 1175999 | 8/1964 | Fed. Rep. of Germany . |
| 2544681A1 | 4/1983 | France . |
| 3429 | of 1872 | United Kingdom . |

OTHER PUBLICATIONS

JRCO Single Wheel Dump Cart—Model 40.
JRCO Single Wheel Dump Cart—Model 40—Owner's Manual.
JRCO Grass Bag Cover—Model 410.
JRCO Cart Bagger—one page dealer bulletin.
JRCO Cart Bagger for Toro Riding Mowers and Tractors—dated 1986.
Cart Bagger Owner's Manual for WheelHorse.
Nothing Works Like a Horse. WheelHorse . . . Of Course!.
WheelHorse Lawn and Garden Equipment—dated 1986.
Horse Sense Lawn and Garden Tips—Spring 1986.
Sun Runner by Simplicity—dated 1986.
Riding Products by Simplicity—dated 1986.
Deutz Allis Lawn and Garden Riding Equipment.
Deutz Allis Vanguard—To Boldly Mow Like You've Never Mowed Before.
Snapper 6-0300 Bag-N-Wagon Kit.
JRCO Cart Bagger brochure dated 1985.
Operator's Manual—JRCO Cart Collector.
PeCo Lawn Vacs brochure—Murray, dated 1981.
PeCo Lawn Vacs, 3405 Mini Vac brochure dated 1984.
Sears & Roebuck catalog, p. 1035.
Snapper Lawn Tractor brochure.

(List continued on next page.)

Primary Examiner—Paul J. Hirsch
Attorney, Agent, or Firm—Merchant, Gould, Smith, Edell, Welter & Schmidt

[57] ABSTRACT

The present invention relates to a multi-purpose cart and grass collector for use with a riding mower or lawn and garden tractor. The multi-purpose cart and grass collector includes two front ends having horizontally aligned apertures therein to provide a two point rigid hitch attachment to the mower or tractor. The cart is supported above the surface of the ground by at least one pivotal wheel and further includes a trailer box which is pivotal about a substantially horizontal axis proximate its back end to facilitate dumping of the trailer box's contents. The multi-purpose cart and grass collector also includes a removable cover assembly having a support framework which rises above the trailer box and which supports a perforated cover. The cover assembly forms an enclosure over the trailer box for receipt of grass clippings. The cover assembly's support framework includes a plurality of pivotal U-shaped rods encased within sleeves in the fabric cover. When the grass clippings are dumped, the pivotal rods and attached cover are pivoted and collapsed into an upright position.

23 Claims, 5 Drawing Sheets

OTHER PUBLICATIONS

Gilson Lawn and Garden Tractors brochure.
Trac Vac Lawn Vacuums brochure.
Trac Vac—The Big Trac Vac Model 1080 brochure.
Dynamark—Out Front Again in '83 brochure dated 1982.
John Deere Riding Mowers & Lawn Tractors brochure.
E-Z Rake, Inc.—Super Lawns the Easy Way brochure.
TORO—Better from the Ground Up brochure, dated 1982.
John Deere Lawn & Garden Tractors brochure.
Simplicity (an Allis-Chalmers Co.) Riding Mowers/Garden Tractors brochure.
Ariens—Tractor Attachments, 1981-82 Models brochure.
WheelHorse—Nothing Works Like a Horse brochure.
Yard-Man Lawn & Garden Tractor Accessories brochure.
Trac Vac—They Fall for it Every Spring brochure.
Parker—It's in the Bag brochure.
John Deere Lawn & Garden Tractors brochure.
Ingersole Hydravac brochure.
Gilson Tractors, Rear Engine Riders, Tillers & Mowers brochure, dated 1984.
E-Z Rake, Inc.—E-Z Vac brochure.

MULTI-PURPOSE CART AND GRASS COLLECTOR

FIELD OF THE INVENTION

The present invention relates to a multi-purpose cart and grass collector with a rigid hitch for use with lawn and garden tractors, riding mowers, and the like. More particularly, the present invention relates to a multi-purpose cart and grass collector which can be readily converted to a bagger for receipt of grass clippings from the grass chute of a lawn and garden tractor and which has a collapsible cover of porous material.

BACKGROUND OF THE INVENTION

Grass collectors which are pulled behind riding mowers and lawn tractors are becoming increasingly popular. One type of grass collector is a single or dual grass bagger which is supported on a frame behind the riding mower or tractor. The bagger frame is sometimes supported above the surface of the ground by a plurality of wheels. A grass chute extending from the mower housing is interconnected to the bagger so as to provide a path for the flow of the grass clippings from the mower to the grass bagger. With some lawn and garden tractors having a two- or three-blade mower deck, an auxiliary engine driven blower or a mower belt driven blower is required in order to provide sufficient force to transport the grass clippings into the bagger.

Smaller mowers or tractors having one- or two-blade mower decks utilize "high lift" blades so that sufficient force is provided by the design of the blade itself and an auxiliary blower is not required. However, many of the grass collectors which rely upon high lift blades have metal, plastic or cloth sides which do not allow the air to move freely through the grass collector. As a result, there is pressure buildup within the grass collector which prevents the free flow of air needed to transport the grass into the bagger, so that a ventilation screen must often be provided.

Currently available vacuum grass collectors which have an auxiliary engine are rather expensive. Also, the grass collectors and baggers are typically capable of only being used for bagging purposes and cannot also be used as a multi-purpose cart. If a cart is provided in conjunction with the grass collector, the collector is typically mounted on a cart having a non-rigid hitch which is difficult to back up and which is easily tipped on hills when full. Another problem is that conventional grass collectors and baggers are often too tall to allow mowing in the proximity of low tree branches.

In addition, many grass collectors require a rather complicated mounting hitch arrangement to enable attachment to the riding mower or garden tractor.

Furthermore, many of the baggers commercially available are difficult to unload. They often do not provide for sufficient pivoting of the grass collector for easy dumping, so that the operator must reach into the grass collector to remove the grass clippings or leaves therewithin.

Another problem with the single or dual bag collectors is that they must be emptied quite frequently, as they are not of sufficient size.

The present invention solves these and many other problems associated with currently available grass collectors.

SUMMARY OF THE INVENTION

The present invention relates to a multi-purpose cart and grass collector for attachment to a riding mower or lawn and garden tractor which is adaptable for receipt of grass clippings from a grass chute of the mower or tractor. The present invention includes a first support framework having a back end facing away from the garden tractor and a front end proximate the garden tractor. The first support framework includes rigid hitch means for attachment to the tractor, and it is supported above the ground by at least one wheel. The wheel(s) are pivotally interconnected to the H-shaped support framework for pivotal motion about a generally vertical axis, the wheels being located closer to the back end of the H-shaped support framework than the front end. The cart and grass collector further includes a trailer box including a floor and a plurality of walls. Latching means is provided for releasably latching the trailer box to the H-shaped support framework. The cart and grass collector further includes a collapsible cover assembly rising above the trailer box. The collapsible cover assembly, removably mounted on the trailer box, includes a second support framework rising above the trailer box and a perforated cover connected thereto. The cover assembly is collapsible between a closed position enclosing the trailer box to an open position exposing the trailer box. The cover assembly also includes means for receiving grass clippings from the grass chute of a garden tractor.

The present invention is particularly advantageous in that it provides for a unique, collapsible support framework for the grass collector's cover assembly. The support framework is easily pivotable between a downward position which allows the cover to form an enclosure over the trailer box, to an upright position which folds the cover and allows the trailer box to be dumped or used as a general utility cart. Further, the support framework and attached cover can be easily attached or removed from the trailer box by utilizing two spring clips.

Another advantageous feature of the present invention is the use of a perforated, porous cover material which allows for easy ventilation of air throughout the cover's top and sides. A substantial part of the cover material is perforated. This feature eliminates the requirement of providing a ventilation screen in the cover. It also prevents pressure build-up within the grass collector itself; the pressure within the grass collector is substantially that of the ambient air. Thus, there is improved, quick movement of the grass clippings from the mower or tractor to the grass collector, because the perforated material "breathes".

In addition, the perforated cover can be easily cleaned by spraying it with a garden hose. The cover is also provided with a window to allow the user to easily monitor when the grass clippings should be dumped.

The present invention is also particularly advantageous in that it is easy to use. The rigid hitch and clevis-like ends of the cart enable easy attachment and removal of the multi-purpose cart and grass collector from the riding mower or garden tractor. Further, the multi-purpose cart is readily converted from a grass collector to a general utility cart by removal of the fabric cover and attached support framework.

The multi-purpose cart, when used as a grass collector, further provides for quick and complete dumping of the clippings contained therein. The grass can be dumped easily when the pivotal support and frame rods of the cover assembly are moved to an upright position, without the problem of grass sticking to the inside of the fabric cover. A plastic sleeve which connects to the mower or tractor's grass chute can be easily disattached therefrom. The trailer box is capable of pivoting the front end upward substantially 90° so as to facilitate dumping or to enable removal of the grass clippings from the back end. Further, in yet another embodiment of the present invention, a single latch handle is used to releasably secure the trailer box to the H-shaped support frame, and the latch handle can be easily released before dumping the contents of the trailer box.

Yet another particular advantage of the present invention is its increased volume for grass clippings. In two particular embodiments of the present invention, the grass collector is capable of holding twelve and twenty bushels of grass respectively.

Yet another advantage of the present invention is its inexpensive nature. The present invention can be used in a host of applications and is capable of being used as a grass collector or as a general utility cart. Further, the universal rigid mounting hitch of the present invention enables the multi-purpose cart and grass collector to be removed and another device, such as another cart or a spreader, to be hitched to the garden tractor. In one embodiment of the present invention, the universal rigid hitch provides a draw bar hole for attachment of other devices. The present invention can also accommodate a customized hitch which conforms with the particular construction of the mower or tractor with which the present invention will be used.

Still another advantageous feature of the present invention is the provision for distribution of weight between the multi-purpose cart and grass collector and the riding mower or garden tractor. This enables the support wheel(s) to swivel easily, and the reduced weight carried by the wheel(s) results in less damage to the lawn.

Still another advantage of the present invention is the provision for a spaced apart, two point, rigid attachment of the multi-purpose cart to the mower or tractor. The rigid hitch prevents the trailer from jackknifing when backing up. The two point attachment also provides for vertical pivotal movement of the multi-purpose cart when it is pulled over uneven ground.

The single wheel configuration of the present invention provides for a highly maneuverable cart with the wheel being pivotal about a vertical axis. The dual wheel configuration is also pivotal about a vertical axis and, as such, is also easily maneuverable. Further, the dual wheel configuration provides for improved stability of the cart and grass collector.

Another advantageous feature of the present invention is its adaptability to different types of riding mowers and lawn and garden tractors. The present invention uses the same grass chute, high lift blades, and baffles normally used for the riding mower's or tractor's rear bagger. If the mower or tractor has high lift blades, then no auxiliary blower is generally required. If an auxiliary blower is provided, the cart and grass collector of the present invention can be used therewith. Also, the present invention can accommodate the mower or tractor's grass chute, and the fabric cover can be fitted for either a side entry or front entry of the grass chute.

These and various other advantages and features of novelty which characterize the invention are pointed out with particularity in the claims annexed hereto and forming a part hereof. However, for a better understanding of the invention, its advantages, and objectives attained by its use, reference should be made to the drawings which form a further part hereof, and to the accompanying descriptive matter, in which there is illustrated and described the preferred embodiment of the invention.

BRIEF DESCRIPTION OF THE DRAWINGS

In the Drawings, reference numerals and letters indicate corresponding parts throughout several views.

DETAILED DESCRIPTION OF THE PREFERRED EMBODIMENT

Figure 1:
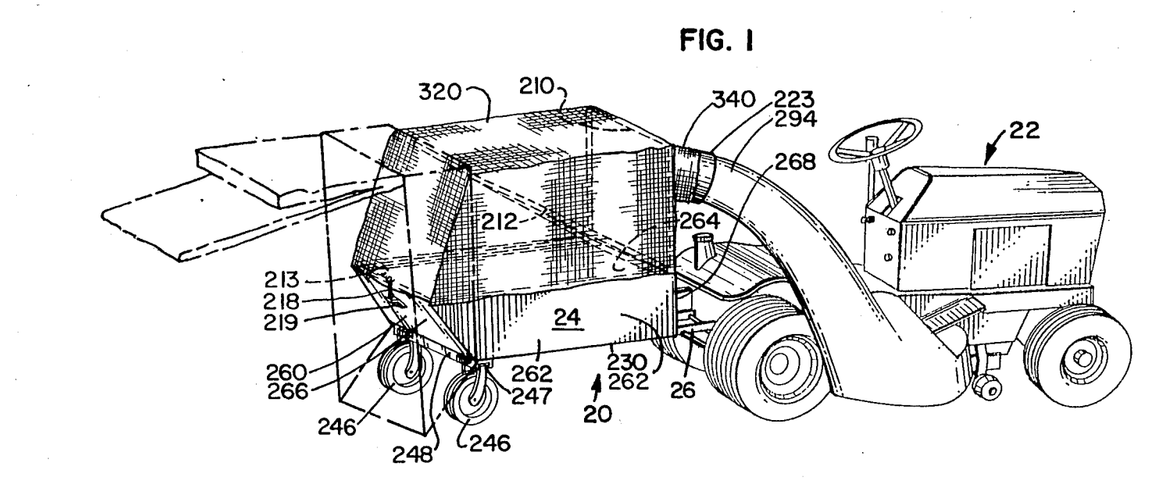
FIG. 1 is a view in perspective of the multi-purpose cart and grass collector in accordance with the principles of the present invention interconnected to a garden tractor.

Referring now to the Drawings, the present invention is shown in FIG. 1, generally designated by the reference numeral 20 interconnected to a garden tractor 22. The multi-purpose cart and grass collector 20 includes a multi-purpose cart 24 and a rigid mounting hitch 26. It will be appreciated that the multi-purpose cart 24 and the rigid mounting hitch 26 each have a particular utility and might be used separately from the other.

Figure 2:
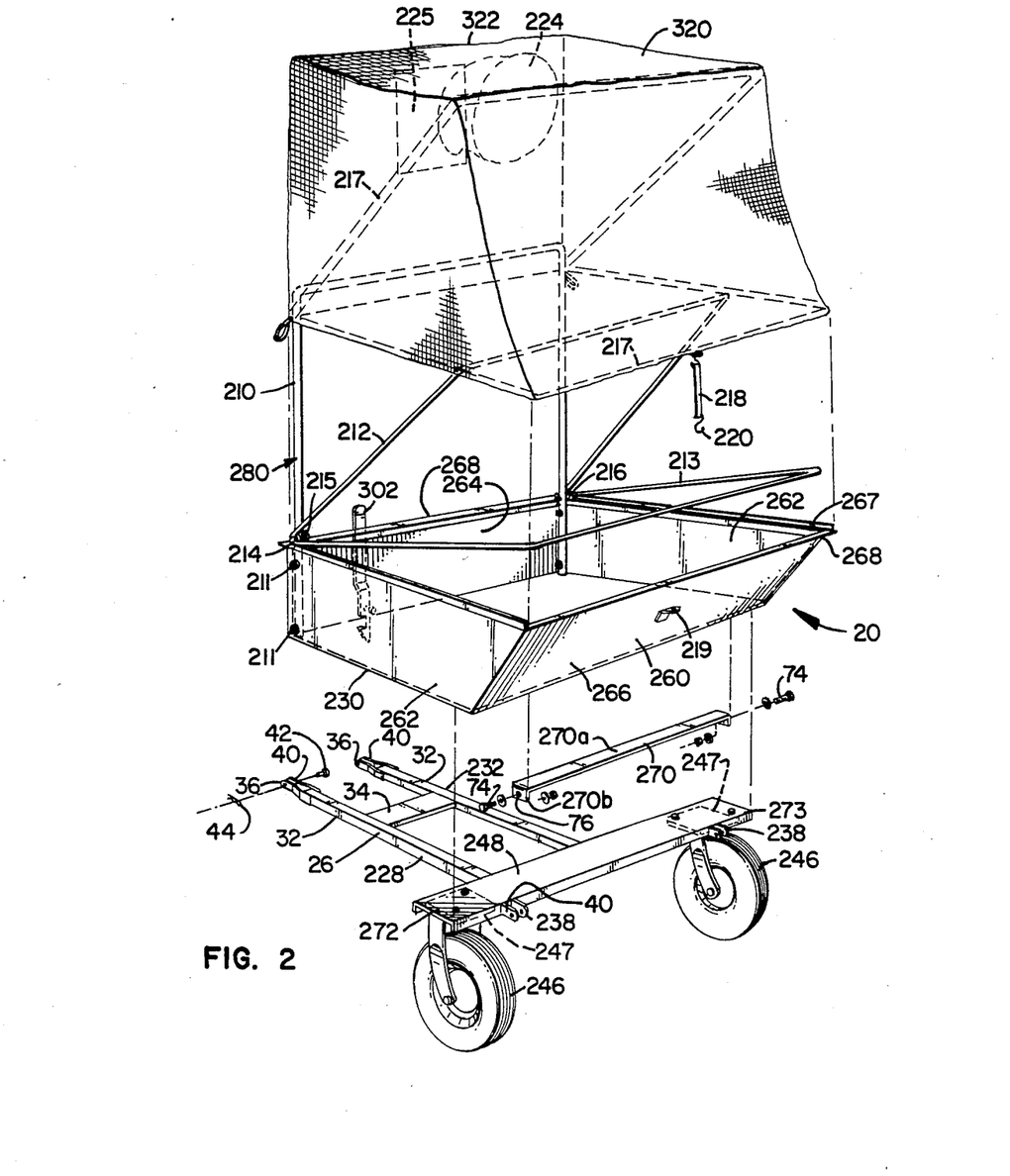
FIG. 2 is an enlarged exploded perspective view of the embodiment of the cart and grass collector shown in FIG. 1.

More particularly, as illustrated in FIG. 2, the multi-purpose cart 24 includes an H-shaped support framework 228 for supporting a trailer box or tray 230. The H-shaped support framework 228 includes two longitudinally extending, spaced apart elongated rectangular members 32 interconnected by a transversely extending elongated rectangular member 34. The longitudinally extending elongated members 32 include clevis-like front and back ends 36 and 238, respectively, having a U-shaped configuration with a pair of horizontally aligned apertures 40. The apertures 40 are adapted to removably receive a clevis pin 42 which in turn is adapted to removably receive a cotter pin 44. Wheels 246 are interconnected to a transversely extending rectangular member 248 proximate the back end of the H-shaped support frame 228 by swivel assemblies 247 for 360° pivotal motion about a vertical axis. The swivel assemblies 247 shown are commercially available forked swivel wheel assemblies with encased bearings. The swivel assemblies 247 are largely spindleless so as to reduce the overall height of the cart and grass collector 20. The axis about which the wheels 246 pivot is slightly offset from the vertical as is common with many such swivel assemblies. The weight distribution of the cart and grass collector 20 is such that the wheels 246 will readily swivel when the cart and grass collector 20 is backed up.

The ends 272 and 273 of the rectangular member 248 extend beyond the H-shaped support framework 228, with the wheels 246 being positioned on each end of the rectangular member 248. If the grass chute outlet tube 224 is positioned at the front of the cover 320, the trailer box 230 and rectangular member 248 can be offset to accommodate the outlet tube 224. As shown in FIG. 2, the offset end 273 of the rectangular member 248 is longer than the end 272. In the alternative, the entire hitch and support framework could be offset with respect to the tractor. In the preferred embodiment, the trailer box 230 is approximately forty-four (44) inches wide, and the offset is approximately ten (10) inches. Preferably, the latch handle 302 is positioned on the end of the trailer box 230 opposite the outlet tube 224 to provide additional structural support, as shown in FIG. 2.

The trailer box or tray 230 includes a floor 260, two vertically extending sides 262, a vertically extending front side 264, and a slanted back side 266 oblique with respect to the floor 260. The trailer box 230 has a greater width than length and is preferably made of steel. The sides 264 and 266 of the trailer box 230 include an outwardly extending horizontal flange 268 along the top edge thereof providing additional structural integrity. The sides 262 of the trailer box 230 include an outwardly extending L-shaped flange 267. The trailer box 230 is pivotally interconnected to the ends 238 of the H-shaped frame 228 by a substantially U-shaped bracket 270 for pivotal motion about a horizontal axis disposed proximate the back end of the H-shaped support framework 228 in back of the wheels 246. The U-shaped bracket 270 is fixedly secured to the floor 260 by suitable fasteners and is pivotally connected to the ends 238 along a horizontal portion 270a by suitable fasteners 74 extending through the aligned apertures 40 in the ends 238 and apertures 76 in vertically extending leg portions 270b of the U-shaped bracket 270.

The height of the cart and grass collector of the present invention is rather low, preferably about forty-two (42) inches, to enable the mower or tractor to get close to low-hanging trees and other obstructions. The cart is preferably no wider than the mower or tractor for easy maneuverability.

The trailer box 230 has attached thereto a second support framework 280 rising above the trailer box 230 which supports a cover assembly. The support framework 280 includes a vertical, U-shaped, frontal rod 210, the ends of which are fastened to the trailer box 230 by means of suitable fasteners 211. Preferably, the ends of the frontal rod 210 are positioned against the front inside corners of the trailer box 230 and securedly affixed thereto. The support frame 280 also includes two U-shaped pivotal frame members, a support rod 212 and a frame rod 213, which are pivotally interconnected to the frontal rod 210 proximate the front end of the trailer box 230. The frontal rod 210, support rod 212, and frame rod 213 are preferably made of a lightweight material such as steel. The frame rod 213 is sized and configured to match the width and length of the trailer box 230, so that the trailer box's flanges 267 and 268 accommodate the frame rod 213 when it is lowered to its downward potion. The frame rod 212 is sized and configured so that when it is lowered to an intermediate position, an enclosure is formed over the trailer box 230. Preferably, the support rod 212 is slightly narrower than the frame rod 213 to facilitate opening of the cover 320 when the trailer box is filled with grass clippings.

Figure 5:
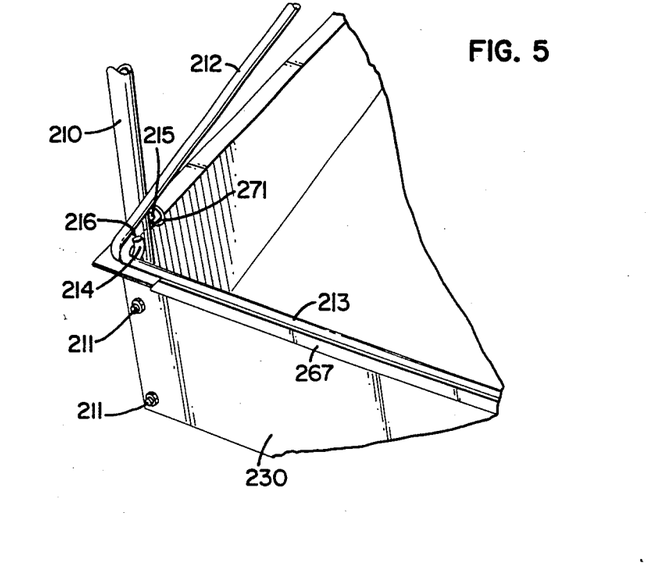
FIG. 5 is a partial view in perspective of the connection of the cover assembly's frontal, frame and support rods.

As best illustrated in FIG. 5, in the preferred embodiment, each end of the support rod 212 includes an integral eyebolt end 214, and each end of the frame rod 213 includes an integral bent end 215. The bent end 215 is inserted through the eyelet formed by the eyelet end 214, and then through an aperture 216 in the frontal rod 210. The bent end 215 is then suitably fastened for a pivotal movement with a spring clip 271. The rods 212 and 213 and attached cover 320 can be easily removed from the trailer box 230 by removing the two spring clips 271. This allows the trailer box 230 to be used as a general utility cart for general hauling purposes.

Figure 6:
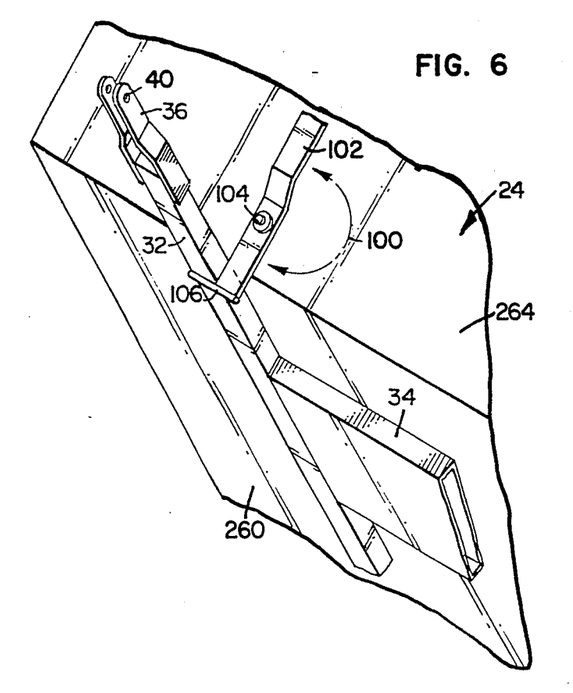
FIG. 6 is a partial diagrammatic view of the underside of the cart shown in FIG. 1 illustrating an embodiment of a latch handle used to releasably secure the cart to its support framework.

As illustrated in FIG. 6, pivotally interconnected on the outside of the front side 264 of the trailer box 230 for pivotal motion about a longitudinally extending axis as generally illustrated by arrows 100 is a vertically extending elongated latch handle 302. The latch handle 102 is pivotally secured by a suitable fastener 104 to the front side 264 of the trailer box 230. The latch handle 102 includes a transversely projecting member 106 adapted to releasably engage the underside of one of the longitudinally extending elongated members 32 of the H-shaped support frame 228 when the latch handle is pivoted clockwise. When the latch handle 102 is pivoted counter-clockwise, the transversely extending member 106 releases the longitudinally extending elongated member 32 such that the trailer box 230 can be pivoted proximate its back end to enable dumping of the trailer contents. To dump the trailer contents, the operator simply pivots the latch handle 102 counter-clockwise and then pushes upward on the front end of the trailer box 230 by using a handle 274. The trailer box 230 will pivot about a substantially horizontal axis extending through the aligned apertures 40 in the ends 238. As illustrated in FIG. 1 by the phantom line 110, the trailer box 230 is capable of pivoting more than 90° so as to enable dumping of the contents.

Figure 3:
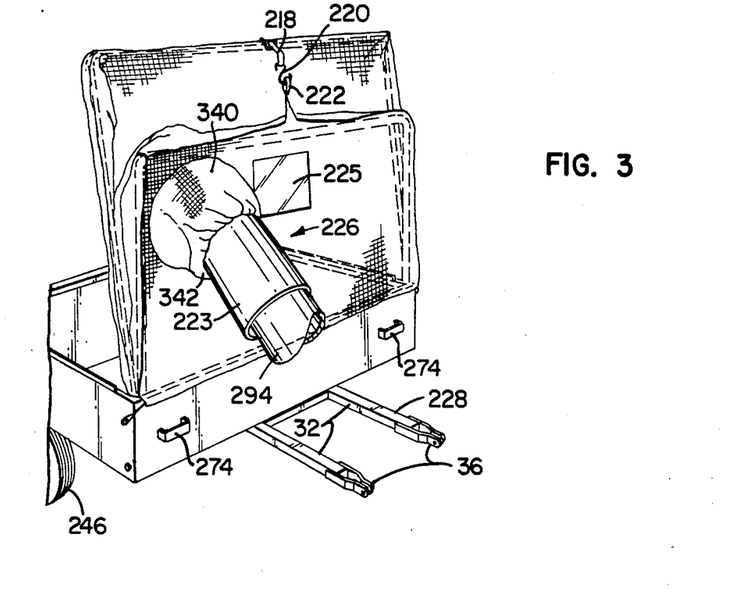
FIG. 3 is a partial view in perspective of the cart and grass collector shown in FIG. 2.

A flexible, perforated fabric cover 320 encloses the trailer box 230 to provide an enclosed receptacle for grass clippings. Preferably, the material is a polyester fabric of circular knit which is able to stretch in all directions. This type of fabric is sturdy, and it allows the cover 320 to "breathe", resulting in unrestricted movement of the grass clippings into the grass collector. The fabric cover 320 is sewn to include seam lines 322 so that the fabric cover 320 includes front and back ends and sides corresponding generally to that of the support framework 280. The fabric cover 320 also has sewn longitudinal sleeves 217 which enclose the pivotal support rod 212 and frame rod 213. Preferably, the sleeves 217 encase the U-shaped rods 212 and 217 on each of their three sides. The back end of the cover 320 may include a strap 218 having a hook 220 which can be attached to a washer or ring 219 on the back end of the trailer box 230 to hold the cover 320 in place when in its closed configuration. The strap 218 can also be used to maintain the cover 320 in its open configuration when desired, as shown in FIG. 3. After the support rod 212 and frame rod 213 are pivoted to their upright position, the hook 220 of the strap 218 can be attached to a ring 222 on the front end of the fabric cover 320. There can also be provided a window 225 in the front portion of the cover 320 to allow the operator to view the amount of grass clippings collected and to determine when the trailer box 230 should be dumped. A dust shield (not shown) may also be provided inside of the front side of the fabric cover to prevent exhausting of dust toward the rider on the tractor.

In operation, the support rod 212 and frame rod 213 are pivoted downward so that the fabric cover 320 forms an enclosure over the trailer box 230. The frame rod 213 is lowered to a substantially horizontal position and is retained against the outward flanges 267 and 268 when in its lowered position. The support rod 212 is lowered to an intermediate position oblique with respect to the trailer box 230, as shown in FIG. 9. The frontal support member 210 stays in a vertical position at all times because it is preferably rigidly secured to the front corners of the trailer box 230. Because the fabric cover 320 is attached to the rods 212 and 213 by the sewn longitudinal sleeves 217 which encase the support rods, the fabric cover 320 folds down as the support rod 212 and frame rod 213 are pivoted to their downward position. The fabric cover 320 thus forms an enclosure over the trailer box 230 for receipt of the grass clippings. FIG. 2 illustrates the position of the support rod 212 and frame rod 213 as they are being lowered, before they are pivoted to their final downward position. After the support rod 212 and frame rod 213 are lowered, the position of the fabric can be secured by attaching the strap 218 to the trailer box 230.

Figure 4:
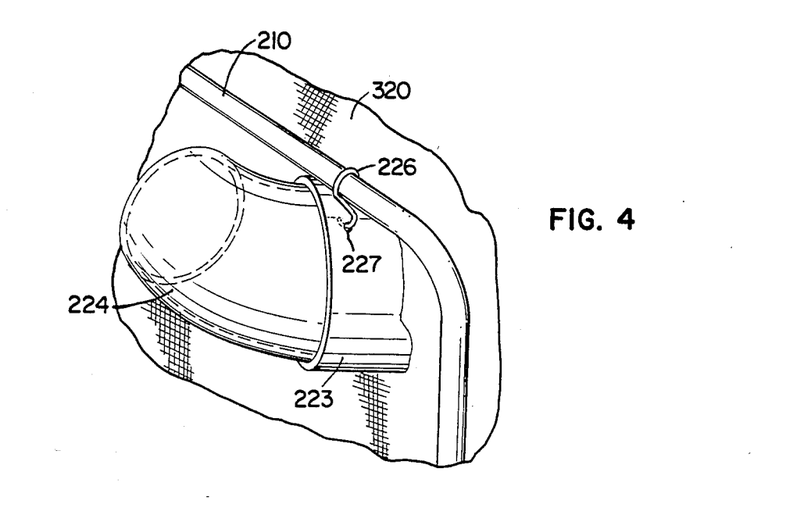
FIG. 4 is a partial view in perspective of the connection of the grass chute to the cart and grass collector of the present invention.

FIGS. 3 and 4 illustrate the connection of the trailer box 230 to the mower's or garden tractor's grass chute 294. As illustrated, the grass chute 294 preferably enters the access port or opening 226 of the cover 320 in the front of the cover. However, the present invention could also be adapted so that the grass chute 294 could also enter from the side of the cover 320. Located inside the fabric cover 320 proximate its front end is an outlet portion 224 of the grass chute 294. A plastic sleeve 223 is provided to facilitate connection between the grass chute 294 and the fabric cover 320. The grass chute 294 slides through the plastic sleeve 223 so that an outlet portion 224 of the chute 294 extends inside the grass cover 320. The fabric cover 320 may include a fabric boot 340 sewn onto the fabric cover 320 including an elastic-like band 342 about the circumference thereof to facilitate a tight fit about the plastic sleeve 223. FIG. 4 illustrates the connection between the plastic sleeve 223 and the frontal support member 210. One or more S-shaped clips 226 can be used to accomplish this connection and to maintain the chute 223 in the proper position. One end of the S-shaped clip 226 attaches around the frontal rod 210, and the other end of the S-shaped clip 226 is inserted through an aperture 227 in the plastic sleeve 223. This connection enables the plastic sleeve 223 to be easily removable from the tractor's grass chute 294.

When the trailer box 230 is being emptied, or when it is being used for another purpose, the operator can collapse the cover assembly, that is, the support rod 212, frame rod 213 and cover 320, into a substantially vertical upright position proximate the front end of the trailer box 230, as shown in FIG. 3. The rods 212 and 213 can be maintained in an upright configuration by attaching the strap 218 to a ring 222 on the front end of the fabric cover 320. This facilitates dumping of the grass clippings, and facilitates loading and unloading of items from the trailer box 230. When it comes time to empty the trailer box 230, the grass chute 294 is disconnected from the cover 320 and plastic sleeve 223. The pivotable rods 212 and 213 are pivoted to a vertical upright position, in order to collapse the cover 320. The latch handle 102 is pivoted so as to release the trailer box 230 from the H-shaped frame 228, and the trailer box 230 is pivoted upward as generally illustrated in phantom in FIG. 1. Handles 274 can be provided at the front of the trailer box 230 to facilitate dumping. Prior to dumping the trailer, the trailer might be backed up slightly such that the wheel is pivoted approximately 90° to assure that it does not interfere with the dumping process.

Figure 7:
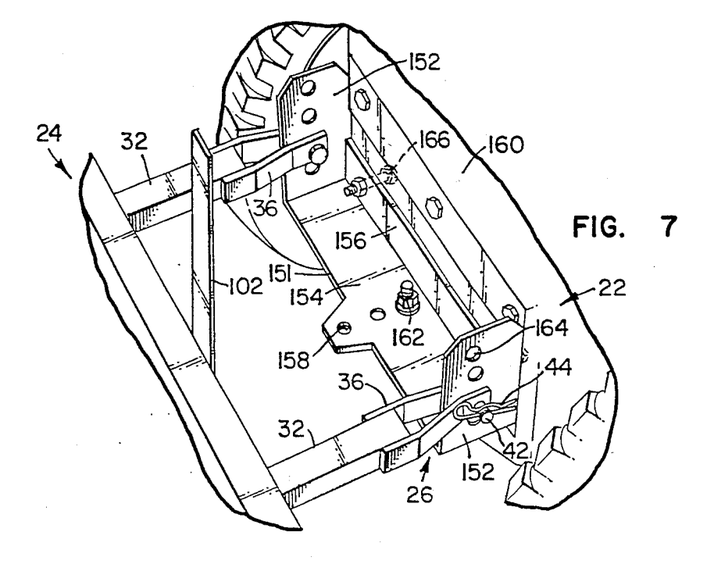
FIG. 7 is a partial view in perspective of an embodiment of a rigid mounting hitch in accordance with the principles of the present invention.

Illustrated in FIG. 7 is an embodiment of the rigid mounting hitch 26 attached to the drawbar (not shown) of the garden tractor 22 and interconnected to the multi-purpose cart 24. The rigid mounting hitch 26 includes a generally U-shaped bracket 151 including two spaced apart vertically extending legs 152 interconnected by a horizontally extending support member 154. In the embodiment shown, a horizontally extending, vertically upright elongated brace member 156 extends between the vertically extending legs 152. The horizontal support member 154 includes a plurality of aligned apertures 158 positioned at varying distances from a back plate 160 of the tractor. In the embodiment shown, the aperture 158 closest to the back plate 160 receives a suitable fastener 162 for attachment of the rigid hitch 26 to the drawbar of the garden tractor 22. The U-shaped bracket 151 serves as an extension of the drawbar as the outermost aperture 158 serves as an aperture for interconnecting other utility carts or the like to the rigid hitch 26 when the multi-purpose cart 24 of the present invention is removed therefrom. The vertically extending legs 152 include a plurality of vertically aligned apertures 164 at varying vertical heights, the corresponding apertures in each of the respective legs 152 being aligned with one another. The legs 152 are adapted to receive the clevis-like ends 36 of the H-shaped support frame 28. Accordingly, to attach the multi-purpose cart 24 to the rigid hitch 26, the apertures 40 of the ends 36 are aligned with selected apertures 164 in the legs 152 and the cotter pin 42 is inserted therethrough. This provides for a vertically pivotal connection of the multi-purpose cart 24 to the rigid hitch 26 and substantially prevents horizontal pivotal movement about a vertical axis at the ends 36. Furthermore, support is provided for each of the ends 36, thereby providing the multi-purpose cart 24 with improved handling characteristics. The multi-purpose cart 24, due to this two point hitch connection, will not jackknife and will also pivot up and down over uneven ground. The brace member 156 in the embodiment shown in FIG. 7 includes fastener members 166 for fastening the U-shaped bracket 151 to the back plate 160 of the garden tractor 22 to keep the U-shaped bracket rigid and prevent pivoting about the fastener 162.

In the alternative, the cart and grass collector 20 could be rigidly attached directly to the garden tractor 22 by suitable fasteners such as bolts. This attachment would prohibit jackknifing by preventing relative pivotal motion between the cart and garden tractor about both a horizontal and a vertical axis.

It will be appreciated that although the embodiment of the invention illustrated is shown in use with a mower or lawn and garden tractor having high lift blades which generate sufficient force to transport the clippings into the enclosed trailer box, the present invention might also be used with those lawn and garden tractors having conventional blades and utilizing an auxiliary engine driven blower or mower belt driven blower to provide sufficient force to transport the clippings into the bagger. Further, it will be appreciated that the grass chute 294 might have any number of configurations. For example, although not shown, most grass chutes are removable from the mower housing.

It is to be understood, however, that even though numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated by the broad general meaning of the terms in which the appended claims are expressed.

I claim:

1. A multi-purpose cart and grass collector for attachment to a garden tractor, lawn tractor, or riding mower, the multi-purpose cart and grass collector being adaptable for receipt of grass clippings from a grass chute of the tractor or mower, the multi-purpose cart and grass collector comprising:
   (a) a first support framework having a front end facing the garden tractor and a back end facing away from the garden trasctor, the first support framework including rigid hitch means proximate the front end for providing attachment to the garden trator, the rigid hitch means providing for pivotal movement about a horizontal axis and prohibiting movement about a vertical axis;
   (b) at least one wheel supporting the first support framework above the surface of the ground, the wheel being pivotally interconnected to the first support framework for pivotal motion, the wheel being located closer to the back end of the first support framework than to the front end of the first support framework;
   (c) a trailer box including a floor and a plurality of walls, the trailer box being pivotally interconnected to the first support framework for pivotal motion about a substantially horizontal axis disposed proximate the back end of the first support framework, such that the floor of the trailer box pivots;
   (d) latching means for releasably latching the trailer box to the first support framework proximate the front end of the first support framework; and
   (e) a collapsible cover assembly removably mounted on the trailer box, the collapsible cover assembly including a second support framework rising above the trailer box and a flexible, perforated cover operatively connected to the second support framework, the second support framework including individual framework members interconnected for pivotal movement relative to each other away and toward the front end of the multi-purpose cart, the cover assembly foldable toward a front end of the trailer box into a more compact, collapsed configuration so as to uncover the trailer box, the collapsible cover assembly including means for receiving grass clippings from the grass chute of the garden tractor into an enclosed area formed by the cover assembly and the trailer box.

2. The multi-purpose cart and grass collector according to claim 1, wherein the cover assembly is collapsible from a closed position enclosing the trailer box to an open position exposing the trailer box, the cover assembly being in a substantially flattened, upright position proximate a front end of the trailer box when in its open position.

3. The multi-purpose cart and grass collector according to claim 1, wherein the perforated cover is made of a polyester fabric having a majority of its surface area perforated, whereby airflow through the cover is facilitated.

4. The multi-purpose cart and grass collector according to claim 1, wherein the width of the trailer box is greater than its length.

5. The multi-purpose cart and grass collector according to claim 1, wherein the means for receiving grass clippings comprises an opening in the cover providing a passageway into the enclosed trailer box, the opening disposed proximate a front end of the cover.

6. The multi-purpose cart and grass collector according to claim 1, wherein the means for receiving grass clippings comprises an opening in the cover providing a passageway into the enclosed trailer box, the opening disposed proximate a side end of the cover.

7. The multi-purpose cart and grass collector according to claim 5, wherein the trailer box is offset to one side with respect to the garden tractor so as to accommodate the frontal entrance of the grass chute of the garden tractor and receive the grass clippings therethrough.

8. The multi-purpose cart and grass collector according to claim 1, wherein the multi-purpose cart and grass collector includes a pair of wheels supporting the first support framework.

9. The multi-purpose cart and grass collector according to claim 1, wherein the second support framework comprises:
   (a) a U-shaped frontal rod having two substantially vertical portions fixedly secured proximate the front corners of the trailer box and a substantially horizontal portion interconnecting the two vertical portions;
   (b) a U-shaped support rod, each end of which is pivotally interconnected to the frontal rod for pivotal motion about a horizontal axis disposed proximate the front end of the trailer box, the support rod being movable between an upright open position and a downward, oblique, closed position; and
   (c) a U-shaped frame rod, each end of which is pivotally interconnected to the frontal rod for pivotal motion about a horizontal axis disposed proximate the front end of the trailer box, the frame rod being movable between and upright open position and a downward, substantially horizontal, closed position.

10. The multi-purpose cart and grass collector according to claim 1, wherein the rigid hitch means comprises a pair of longitudinally aligned apertures in front ends of elongated members extending from the front end of the first support framework, the apertures adapted for pivotal receipt of a pin like member for two point pivotal attachment to the garden tractor.

11. The multi-purpose cart and grass collector according to claim 1, wherein the latching means includes a vertically extending, elongated latch handle pivotally attached to the front side of the trailer box for pivotal movement about a horizontal axis, the latch handle including proximate a bottom end thereof a horizontally extending member adapted for pivotal movement between first and second positions, the horizontally extending member being positioned under one of the longitudinally extending elongated members when in the first position so as to latch the trailer box to the first support framework and positioned away from the longitudinally extending elongated member in the second position so as to enable the trailer box to be pivoted relative to the first support framework.

12. The multi-purpose cart and grass collector according to claim 1, further comprising a dust shield disposed proximate the front end of and inside the fabric cover.

13. The multi-purpose cart and grass collector according to claim 1, further including means to hold the cover in its closed and open positions respectively, the means comprising:
  (a) a strap, one end of which is securely fastened to a back side of the fabric cover, the opposite end of which includes a hook;
  (b) a ring securely attached to the back end of the trailer box which cooperates with the hook when the fabric cover is in its closed configuration; and
  (c) a ring securely attached to the front side of the fabric cover which cooperates with the hook when the fabric cover is in its open configuration so that the fabric cover does not interfere with the dumping of the grass clippings.

14. The multi-purpose cart and grass collector according to claim 1, further comprising a plastic sleeve which connects the grass chute of the garden tractor to the opening in the cover so as to provide a passageway for the grass clippings.

15. A multi-purpose cart and grass collector for attachment to a garden tractor, lawn tractor, or riding mower, the multi-purpose cart and grass collector being adaptable for receipt of grass clippings from a grass chute of the tractor or mower, the multi-purpose cart and grass collector comprising:
  (a) an H-shaped support framework having a front end facing the garden tractor and a back end facing away from the garden tractor and including two longitudinally spaced apart elongated members interconnected by a transversely extending member, the longitudinally extending members having rigid hitch means for providing attachment to the garden tractor;
  (b) a pair of wheels supporting the H-shaped support framework above the surface of the ground, the wheels being pivotally interconnected to the H-shaped support framework for pivotal motion, the wheels being located closer to the back end of the H-shaped support framework than to the front end of the H-shaped support framework;
  (c) a trailer box including a floor, two side walls and a front and back wall, the trailer box being pivotally interconnected to the H-shaped support framework for pivotal motion about a substantially horizontal axis disposed proximate the back end of the H-shaped support framework and proximate the intersection of the floor and the back wall such that the floor of the trailer box pivots at least substantially ninety degrees for unloading;
  (d) latching means for releasably latching the trailer box to the H-shaped support framework proximate the front end of the H-shaped support framework, the latching means disposed opposite the side of the trailer box which has been offset so as to provide structural support; and
  (e) a collapsible cover assembly removably mounted on the trailer box and pivotally foldable toward a front end of the trailer box into a collapsed configuration so as to uncover the trailer box, the collapsible cover assembly including a flexible, perforated fabric cover having sleeves therein to accommodate and operatively connect to a second support framework rising above the trailer box, the cover including an opening which provide a passageway into the enclosed trailer box, the second support framework comprising:
  (i) a U-shaped frontal rod having two substantially vertical portions fixedly secured to the inside of the front corners of the trailer box and a substantially horizontal portion therebetween;
  (ii) a U-shaped support rod, each end of which is pivotally interconnected to the frontal rod for pivotal motion about a horizontal axis disposed proximate the front end of the trailer box, the support rod being movable between an upright open position and a downward, oblique closed position; and
  (iii) a U-shaped frame rod, each end of which is pivotally interconnected to the frontal rod for pivotal motion about a horizontal axis disposed proximate the front end of the trailer box, the frame rod being movable between an upright open position and a downward, substantially horizontal closed position, wherein the support and frame rods are encased within the sleeves in the fabric cover.

16. The multi-purpose cart and grass collector according to claim 15, further comprising a flange proximate the upper edge of the trailer box which accommodates the frame rod when it is in its downward substantially horizontal position.

17. The multi-purpose cart and grass collector according to claim 15, wherein the rigid hitch means comprises a pair of longitudinally aligned apertures in the front ends of the longitudinally extending members, the apertures adapted for pivotal receipt of a pin like member for two point pivotal attachment to the garden tractor.

18. The multi-purpose cart and grass collector according to claim 15, wherein the latching means includes a vertically extending, elongated latch handle pivotally attached to the front side of the trailer box for pivotal movement about a horizontal axis, the latch handle including proximate a bottom end thereof a horizontally extending member adapted for pivotal movement between first and second positions, the horizontally extending member being positioned under one of the longitudinally extending elongated members when in the first position so as to latch the trailer box to the H-shaped frame and positioned away from the longitudinally extending elongated member in the second position so as to enable the trailer box to be pivoted relative to the H-shaped frame.

19. The multi-purpose cart and grass collector according to claim 15, further comprising a dust shield disposed proximate the front end of and inside the fabric cover.

20. The multi-purpose cart and grass collector according to claim 15, wherein the means to hold the fabric cover in its closed and open positions respectively comprises:
  (a) a strap, one end of which is securely fastened to the back side of the fabric cover, the opposite end of which includes a hook;

(b) a ring securely attached to the back end of the trailer box which cooperates with the hook when the fabric cover is in its closed configuration; and (c) a ring securely attached to the front side of the fabric cover which cooperates with the hook when the fabric cover is in its open configuration so that the fabric cover does not interfere with the dumping of the grass clippings.

21. The multi-purpose cart and grass collector according to claim 15, further comprising a plastic sleeve which connects the grass chute of the garden tractor to the opening in the cover so as to provide a passageway for the grass clippings.

22. A multi-purpose cart and grass collector for attachment to a garden tractor, lawn tractor, or riding mower, the multi-purpose cart and grass collector being adaptable for receipt of grass clippings from a grass chute of the tractor or mower, the multi-purpose cart and grass collector comprising:

(a) an H-shaped support framework having a front end facing the garden tractor and a back end facing away from the garden tractor and including two longitudinally spaced apart elongated members interconnected by a transversely extending member, the longitudinally extending members having rigid hitch means for providing attachment to the garden tractor, the rigid hitch means comprising a pair of longitudinally aligned apertures in the front ends of the longitudinally extending members, the apertures adapted for pivotal receipt of a pin like member for two point pivotal attachment to the garden tractor;

(b) a pair of wheels supporting the H-shaped support framework above the surface of the ground, the wheels being pivotally interconnected to the H-shaped support framework for pivotal motion, the wheels being located closer to the back end of the H-shaped support framework than to the front end of the H-shaped support framework;

(c) a trailer box having a flange on its upper edge including a floor, two side walls and a front and back wall, the trailer box being pivotally interconnected to the H-shaped support framework for pivotal motion about a substantially horizontal axis disposed proximate the back end of the H-shaped support framework and proximate the intersection of the floor and the back wall such that the floor of the trailer box pivots at least substantially ninety degrees for unloading, the trailer box being offset to one side with respect to the garden tractor, the trailer box being greater in width than in length;

(d) latching means for releasably latching the trailer box to the H-shaped support framework proximate the front end of the H-shaped support framework, the latching means disposed opposite the side of the box which has been offset so as to provide structural support;

(e) a flexible, perforated fabric cover adapted to removably fit over and enclose the trailer box, having a dust shield within its front side, said cover including sleeves therein and including a strap and hook to hold said cover in its closed and open positions respectively, said cover further including an opening which provides a passageway into the enclosed trailer box, said opening disposed proximate the front end of the cover; and (f) a support framework rising above the trailer box, comprising:

(i) a U-shaped frontal rod having two substantially vertical portions fixedly secured to the inside of the front corners of the trailer box and a substantially horizontal portion therebetweeen;

(ii) a U-shaped support rod, each end of which is pivotally interconnected to the frontal rod for pivotal motion about a horizontal axis disposed proximate the front end of the trailer box, said support rod being movable between an upright open position and a downward, oblique closed position; and (iii) a U-shaped frame rod, each end of which is pivotally interconnected to the frontal rod for pivotal motion about a horizontal axis disposed proximate the front end of the trailer box, said frame rod being movable between an upright open position and a downward, substantially horizontal closed position, wherein said support and frame rods are encased within corresponding sleeves in the fabric cover, the fabric cover and the support framework pivotally foldable away and toward the front end of the trailer box between a non-collapsed, position enclosing the trailing box and and a collapsed position exposing the trailer box.

23. A multi-purpose cart and grass collector used with a prime mover apparatus, comprising:

(a) a first support framework having a front end facing the prime mover apparatus and a back end facing away from the prime mover apparatus, the first support framework including hitch means for attaching the first support framework to the prime mover apparatus;

(b) at least one wheel supporting the first support framework above the surface of the ground, the wheel being pivotally interconnected to the first support framework for pivotal motion, the wheel being closer to the back end of the first support framework than to the front end of the first support framework;

(c) a trailer pivotally interconnected to the first support framework for pivotal motion about a substantially horizontal axis disposed proxiamte the back end of the first support framework, such that the floor of the trailer pivots;

(d) latching means for releasably latching the trailer to the first support framework proximate the front end of the first support framework; and (e) a collapsible cover assembly foldable toward a front end of the trailer box into a more compact, collapsed configuration so as to uncover the trailer box, the collapsible cover assembly including a flexible, perforated cover supported above the trailer box by a second framework, the second framework including a first stationary framework portion proximate a front end of the trailer and a second framework portion proximate a back end of the trailer movable relative to the first stationary framework portion, the collapsible cover assembly further including means for receiving grass clippings.

* * * * *